(12) United States Patent
Nefzger et al.

(10) Patent No.: US 9,193,822 B2
(45) Date of Patent: Nov. 24, 2015

(54) PROCESS FOR PRODUCING POLYESTER POLYOLS HAVING SECONDARY OH END GROUPS

(75) Inventors: Hartmut Nefzger, Pulheim (DE); Erika Bauer, Jüchen (DE); Jörg Hofmann, Krefeld (DE); Klaus Lorenz, Dormagen (DE); Bert Klesczewski, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 516 days.

(21) Appl. No.: 13/318,157

(22) PCT Filed: May 4, 2010

(86) PCT No.: PCT/EP2010/002697
§ 371 (c)(1),
(2), (4) Date: Nov. 29, 2011

(87) PCT Pub. No.: WO2010/127823
PCT Pub. Date: Nov. 11, 2010

(65) Prior Publication Data
US 2012/0116114 A1     May 10, 2012

(30) Foreign Application Priority Data

May 6, 2009   (EP) .................................... 09006162

(51) Int. Cl.
   *C07C 69/675*   (2006.01)
   *C08G 63/91*    (2006.01)
   *C08G 18/42*    (2006.01)
   *C08G 63/87*    (2006.01)

(52) U.S. Cl.
   CPC .......... *C08G 63/914* (2013.01); *C08G 18/4261* (2013.01); *C08G 63/87* (2013.01)

(58) Field of Classification Search
   CPC .............................. C07C 45/00; C07C 69/675
   USPC ........................................... 568/386; 560/176
   See application file for complete search history.

(56) References Cited

U.S. PATENT DOCUMENTS 4,144,395 A * 3/1979 Murphy et al. ................ 560/200
4,845,266 A * 7/1989 Marx et al. ...................... 560/91

FOREIGN PATENT DOCUMENTS

DE    28 49 549 A1   6/1979
DE    36 13 875 A1   10/1987
EP    0 010 804 A1   5/1980

* cited by examiner

*Primary Examiner* — Yong Chu
*Assistant Examiner* — Sonya Wright
(74) *Attorney, Agent, or Firm* — Drinker Biddle & Reath LLP

(57) ABSTRACT

The invention relates to a process for producing polyester polyols with secondary hydroxyl end groups, including the step of the reaction of a polyester including carboxyl end groups with an epoxide of the general formula (1):

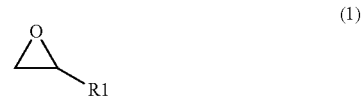

wherein R1 stands for an alkyl residue or an aryl residue and the reaction is carried out in the presence of a catalyst that includes at least one nitrogen atom per molecule. The process is distinguished in that the polyester including carboxyl end groups exhibits an acid value from ≥25 mg KOH/g to ≤400 mg KOH/g and a hydroxyl value from ≤5 mg KOH/g and in that the polyester including carboxyl end groups is produced by ≥1.03 mol to ≤1.90 mol carboxyl groups or carboxyl-group equivalents of an acid component being employed per mol hydroxyl groups of an alcohol. The polyester polyols obtained, including secondary hydroxyl end groups, can be used for the purpose of producing polyurethane polymers.

7 Claims, No Drawings

PROCESS FOR PRODUCING POLYESTER POLYOLS HAVING SECONDARY OH END GROUPS

CROSS-REFERENCE TO RELATED APPLICATIONS

This application is a national stage application (under 35 U.S.C. §371) of PCT/EP2010/002697, filed May 4, 2010, which claims benefit of European application 09006162.3, filed May 6, 2009, both of which are incorporated herein by reference in their entirety for all their useful purposes.

BACKGROUND

The present invention relates to a process for producing polyester polyols with secondary hydroxyl end groups, including the step of the reaction of a polyester including carboxyl end groups with an epoxide. It further relates to polyester polyols with secondary hydroxyl end groups that are obtainable by this process and to a polyurethane polymer that is obtainable from the reaction of a polyisocyanate with such polyester polyols.

Technically relevant polyester polyols for the production of polyurethane polymers exhibit primary hydroxyl end groups as a consequence of the $\alpha,\omega$-diols that are used for their synthesis. The use of diols with wholly or partly secondary hydroxyl end groups—such as, for instance, 1,2-propylene glycol or dipropylene glycol—results in polyester polyols that with respect to the end groups are, to some extent, endowed just like the diols synthesising them. In the case of 1,2-propylene glycol, about 50% of the hydroxyl end groups would be secondary.

Diols that exhibit only secondary hydroxyl end groups—such as, for example, 2,3-butanediol—play no role on a technical scale by reason of the commercially available quantities and the cost. An additional aggravating factor in the case of all diols exhibiting secondary hydroxyl groups in the synthesis of polyester is that the rate of conversion with dicarboxylic acids is lower.

Particularly disadvantageous, furthermore, is the fact that, as a consequence of the numerous short alkyl side groups, the properties of the polyurethanes produced from polyesters of such a type are distinctly poorer than those of polyurethanes that are obtained from $\alpha,\omega$-diols. Accordingly, conventional polyester polyols, which are produced with the aforementioned diols with at least partly secondary hydroxyl end groups, are both more expensive in the manufacturing costs, in part more expensive in the material costs, and also less suitable for producing high-quality polyurethanes. For this reason, up until now polyester polyols with secondary hydroxyl end groups have, in contrast to polyether polyols, had no relevant significance technically.

It would be desirable to have polyester polyols available that, in their interior, contain $\alpha,\omega$-diol units and, at their chain end, a unit with secondary hydroxyl groups. A structure of such a type would have the consequence of a diminished reactivity towards polyisocyanates and makes it possible, for example in the field of the polyurethane flexible foams, to employ, besides the amine catalysts which mainly drive the water reaction, also additional urethanisation catalysts such as tin salts. In particular, this opens up the possibility, widely utilised in the field of the polyether polyurethane foams, of matching these two reactions better to one another and thereby, for example, of obtaining processing advantages in the production of polyester polyurethane flexible foams.

The functionalisation of carboxyl groups in the course of polyester-polyol synthesis is disclosed in DE 36 13 875 A1. For the purpose of producing polyester polyols with an acid value of less than 1, with a hydroxyl value from approximately 20 to approximately 400, and with a functionality of, expediently, 2 to 3, polycarboxylic acids and/or the anhydrides thereof and polyhydric alcohols are condensed. This happens advantageously in the absence of customary esterification catalysts at temperatures from 150° C. to 250° C. and optionally under reduced pressure. Polycondensation is effected as far as an acid value from 20 to 5, and the polycondensates obtained are then alkoxylated per carboxyl group with 1 mol to 5 mol alkylene oxide, for example 1,2-propylene oxide and/or preferentially ethylene oxide, in the presence of a tertiary amine. The tertiary amine is selected from the group comprising N-methylimidazole, diazabicyclo-[2,2,2]octane, diazabicyclo[5,4,0]undec-7-ene and pentamethyldiethylenetriamine. The catalyst is expediently employed in a quantity from 0.001 wt. % to 1.0 wt. %, relative to the weight of the polycondensate. Advantageously, alkoxylation is effected at temperatures from 100° C. to 170° C. and under a pressure from 1 bar to 10 bar.

In the process according to DE 36 13 875 A1 the esterification mixture is polycondensed as far as an acid value from 20 to 5. It is stated as essential that the melt condensation is not terminated too early. If, for example, alkoxylation is effected at an acid value of 25 or greater, the water content of the esterification mixture is said to be excessively high. This would, however, result in undesirable side reactions. If the synthesis of the polyesters is terminated at an acid value from 20 to 5, this means that a comparatively high proportion of terminal hydroxyl groups originating from the alcohol component, and therefore, as a rule, of primary hydroxyl groups, is already present. For the purpose of shortening the synthesis-time, the residual carboxyl groups are then converted with epoxides, whereby terminal hydroxyl groups originating from the epoxides are obtained.

EP 0 010 804 A1 discloses a powder coating on the basis of carboxyl-group-terminated polyesters, an epoxy compound and a choline compound of the formula [Y—CH$_2$—CH$_2$—N—(—CH$_3$)$_3$$^+$]$_n$X$^{n-}$, in which X is OR or —O—C(O)—R and R is hydrogen or a C$_{1-40}$ group and X$^{n-}$ is an anion. Preferentially Y is OH or a —O—C(O)—R group. These powder coatings are less susceptible to yellowing and are not toxic. However, according to this document the epoxy compound exhibits, on average, two or more epoxy groups per molecule. The epoxy compound serves here in order to cross-link polyester molecules with one another, and not for synthesising OH-terminated polyester molecules.

DE 28 49 549 A1 discloses a process for producing polyether polyester polyols by conversion of a polyether polyol with a polycarboxylic acid anhydride to form an acid half-ester. Subsequently the acid-half-ester is converted with an alkylene oxide into a product with an acid value of less than 5 mg KOH/g. The conversion of the alkylene oxide with the acid-half-ester is carried out in the presence of 50 ppm to 100 ppm, relative to the initial polyether polyol, of a trialkylamine with 2 to 4 carbon atoms in the alkyl chain. The polyol that is obtained, however, is still based on polyethers and not on polyesters.

U.S. Pat. No. 4,144,395 discloses a process for producing polyether ester, wherein by conversion of a polyether polyol with anydride a half-ester is formed which is converted with epoxides into polyether ester, whereby alkylamines are employed as catalysts. The half-ester obtained as intermediate in Examples 1 and 2 of U.S. Pat. No. 4,144,395, formed from maleic acid (0.75 mol) and trifunctional polyether polyol (0.75 mol), differs structurally from the polyester including carboxyl end groups that is employed in accordance with the present invention.

Consequently a demand continues to exist for alternative production processes for polyester polyols with secondary hydroxy end groups.

DESCRIPTION OF PREFERRED EMBODIMENTS

The invention provides a process for producing polyester polyols with secondary hydroxyl end groups, including the step of the reaction of a polyester including carboxyl end groups with an epoxide of the general formula (1):

(1)

wherein R1 stands for an alkyl residue or an aryl residue and the reaction is carried out in the presence of a catalyst that includes at least one nitrogen atom per molecule. The process according to the invention is distinguished in that the polyester including carboxyl end groups exhibits an acid value from ≥25 mg KOH/g to ≤400 mg KOH/g and a hydroxyl value of ≤5 mg KOH/g and in that the polyester including carboxyl end groups is produced by ≥1.03 mol to ≤1.90 mol carboxyl groups or carboxyl-group equivalents of an acid component being employed per mol hydroxyl groups of an alcohol.

Polyester polyols produced in accordance with the invention have the advantage that, on account of the lower rate of reaction of their secondary hydroxyl end groups in the further processing to form polyurethane polymers and in particular polyurethane foams, a greater range of catalyst systems can be employed. In particular, tin catalysts can sometimes be used as substitute for amine catalysts. A lower proportion of amine catalysts has a favourable effect on properties such as odour and resistance to ageing of the polyurethanes.

The acid value of the polyesters including carboxyl end groups can be determined on the basis of standard DIN 53402 and may also amount to ≥30 mg KOH/g to ≤300 mg KOH/g or ≥50 mg KOH/g to ≤250 mg KOH/g. The hydroxyl value of the polyesters including carboxyl end groups can be determined on the basis of standard DIN 53240 and may also amount to ≤3 mg KOH/g or ≤1 mg KOH/g.

Suitable for conversion with the epoxide of the general formula (1) are, in principle, all polyesters including carboxyl end groups, provided they satisfy the conditions of the acid values and hydroxyl values according to the invention. These polyesters are also designated synonymously as polyester carboxylates. Polyester carboxylates can be produced by polycondensation from low-molecular polyols and low-molecular polycarboxylic acids, inclusive of the anhydrides thereof, and the alkyl esters thereof. Furthermore, hydroxycarboxylic acids, inclusive of the internal anhydrides (lactones) thereof, may be used or may be used concomitantly.

The polyester carboxylates that can be employed in accordance with the invention have predominantly carboxyl end groups. For instance, the end groups may be carboxyl groups in a proportion of ≥90 mol %, of ≥95 mol % or of ≥98 mol %. In contrast, they exhibit hydroxyl end groups only to a very subordinate extent, as results from the specification, according to the invention, of the hydroxyl values. Irrespective of what was explained previously, the number of carboxyl end groups may, for example, exceed the number of hydroxyl end groups by ≥5-fold or even ≥10-fold. Suitable polyester carboxylates may exhibit molecular weights within the range from ≥400 Da to ≤10,000 Da, preferably from ≥450 Da to ≤6000 Da. Likewise, irrespective of what was explained previously, the number of carboxyl end groups in the polyester carboxylate may amount to 2, 3, 4, 5 or 6. The average functionality of the polyester carboxylates may be, for example, ≥2 to ≤3.

Low-molecular polyols that are capable of being employed for the purpose of producing the polyester carboxylates are, in particular, those with hydroxyl functionalities from ≥2 to ≤8. They have, for example, ≥2 to ≤36, preferably ≥2 to ≤12, C atoms. Generally it is advantageous if the polyols are α,ω-polyols, in particular α,ω-diols or α,ω-diols in a proportion amounting to at least 90 mol %. Quite particularly preferred are polyols from the group comprising ethylene glycol and diethylene glycol and the higher homologues thereof, furthermore 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol and the higher homologues thereof, furthermore 2-methylpropanediol-1,3, neopentyl glycol, 3-methylpentanediol-1,5, furthermore glycerin, pentaerythritol, 1,1,1-trimethylolpropan and/or carbohydrates with 5 to 12 C atoms, such as isosorbide.

Likewise employable are, furthermore, 1,2-propanediol, dipropylene glycol and the higher homologues thereof.

Of course, mixtures of polyols can also be employed wherein the named polyols contribute at least 90 mol % of all the hydroxyl groups.

Low-molecular polycarboxylic acids or the acid equivalents thereof, such as, for example, anhydrides, that are capable of being employed for the purpose of producing the polyester carboxylates, have, in particular, 2 to 36, preferably 2 to 12, C atoms. The low-molecular polycarboxylic acids may be aliphatic or aromatic. They can be selected from the group comprising succinic acid, fumaric acid, maleic acid, maleic acid anhydride, glutaric acid, adipic acid, sebacic acid, suberic acid, azelaic acid, 1,10-decanedicarboxylic acid, 1,12-dodecanedicarboxylic acid, phthalic acid, phthalic acid anhydride, isophthalic acid, terephthalic acid, pyromellitic acid and/or trimellitic acid.

Of course, mixtures of low-molecular polycarboxylic acids can also be employed wherein the named polycarboxylic acids contribute at least 90 mol % of all the carboxyl groups.

If hydroxycarboxylic acids, inclusive of the internal anhydrides (lactones) thereof, are used or are used concomitantly, these preferably originate from the group comprising caprolactone and 6-hydroxycaproic acid.

The polycondensation is preferably effected without catalyst, but it may also be catalysed by the catalysts known to a person skilled in the art. The polycondensation can be carried out by common methods, for example at elevated temperature, in a vacuum, as azeotropic esterification and by the nitrogen-blowing process. For the purpose of obtaining the acid values and hydroxyl values provided in accordance with the invention, the polycondensation is not terminated at a particular stage but is carried out by removing the water that is formed up until a conversion of the OH groups of the alcohol that is as complete as possible, forming carboxyl end groups.

The epoxide of the general formula (1) is a terminal epoxide with a substituent R1 which may be an alkyl residue or an aryl residue. The term 'alkyl' generally encompasses, in the context of the entire invention, substituents from the group comprising n-alkyl, such as methyl, ethyl or propyl, branched alkyl and/or cycloalkyl. The term 'aryl' generally encompasses, in the context of the entire invention, substituents from the group comprising mononuclear carboaryl or heteroaryl substituents such as phenyl and/or polynuclear carboaryl or heteroaryl substituents. The molar ratio of epoxide to carboxyl end group in the process according to the invention may, for example, lie within a range from ≥0.9:1 to ≤10:1, preferably from ≥0.95:1 to ≤5:1 and more preferably from ≥0.98:1 to ≤3:1.

The reaction of the polyester carboxylates with the epoxide is effected in the presence of a catalyst that includes at least one nitrogen atom in the molecule. The quantity of this nitrogenous catalyst, relative to the total mass of the reaction charge, may, for example, amount to ≥10 ppm to ≤10,000 ppm, preferably ≥50 ppm to ≤5000 ppm and more preferably ≥100 ppm to ≤2000 ppm.

By virtue of the reaction of the carboxyl groups of the polyester with the epoxide, primary or secondary alcohols arise, subject to ring opening, depending on the location of the attack on the epoxide ring. Preferentially ≥80%, ≥90% or ≥95% of the carboxyl groups react with the epoxide, and preferentially a proportion of secondary hydroxyl groups from ≥50 mol % to ≤100 mol % or from ≥60 mol % to ≤85 mol % is obtained.

In one embodiment of the process according to the invention the polyester including carboxyl end groups is produced by ≥1.03 mol to ≤1.90 mol carboxyl groups or carboxyl-group equivalents of an acid component being employed per mol hydroxyl groups of an alcohol. By virtue of the excess of the carboxyl groups or the equivalents thereof, such as anhydrides, it can be ensured that a far predominating fraction of the end groups or even all the end groups of the polyester are carboxyl groups. In the following reaction with the epoxide these can then be converted further into the corresponding alcohols. The excess of carboxyl groups may also amount to ≥1.04 mol to ≤1.85 mol or ≥1.05 mol to ≤1.5 mol per mol hydroxyl groups.

In a further embodiment of the process according to the invention the polyester including carboxyl end groups is produced immediately before the reaction with the epoxide of the general formula (1). This means that directly subsequent to the production of the polyester the conversion with the epoxide is carried out using a catalyst with at least one nitrogen atom per molecule. Advantageously the conversion is carried out by the epoxide being added to the reaction mixture from the polyester synthesis. This is advantageously effected in the same production plant. In this way, production time is saved.

In a further embodiment of the process according to the invention the polyester including carboxyl end groups is obtainable from the reaction of
ethylene glycol and diethylene glycol and also the higher homologues thereof, 1,3-propanediol, 1,4-butanediol, 1,6-hexanediol, 1,8-octanediol, 1,10-decanediol, 1,12-dodecanediol, 2-methylpropanediol-1,3, neopentyl glycol, 3-methylpentanediol-1,5, glycerin, pentaerythritol and/or 1,1,1-trimethylolpropane
with
succinic acid, fumaric acid, maleic acid, maleic acid anhydride, glutaric acid, adipic acid, sebacic acid, 1,10-decanedicarboxylic acid, 1,12-dodecanedicarboxylic acid, phthalic acid, phthalic acid anhydride, isophthalic acid, terephthalic acid, pyromellitic acid, trimellitic acid and/or caprolactone.

In a further embodiment of the process according to the invention the catalyst is selected from the group comprising:

(A) amines of the general formula (2):

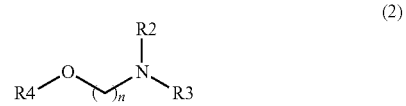

(2)

wherein it holds that:
R2 and R3 are, independently of one another, hydrogen, alkyl or aryl; or
R2 and R3 form, jointly with the N atom carrying them, an aliphatic, unsaturated or aromatic heterocyclic compound;
n is an integer from 1 to 10, that is, 1, 2, 3, 4, 5, 6, 7, 8, 9 or 10;
R4 is hydrogen, alkyl or aryl; or
R4 stands for —(CH$_2$)$_x$—N(R41)(R42), wherein it holds that:
R41 and R42 are, independently of one another, hydrogen, alkyl or aryl; or
R41 and R42 form, jointly with the N atom carrying them, an aliphatic, unsaturated or aromatic heterocyclic compound;
x is an integer from 1 to 10, that is, 1, 2, 3, 4, 5, 6, 7, 8, 9 or 10;

(B) amines of the general formula (3):

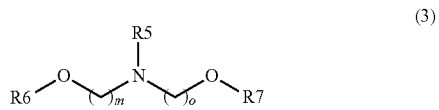

(3)

wherein it holds that:
R5 is hydrogen, alkyl or aryl;
R6 and R7 are, independently of one another, hydrogen, alkyl or aryl;
m and o are, independently of one another, an integer from 1 to 10, that is, 1, 2, 3, 4, 5, 6, 7, 8, 9 or 10;
and/or:
(C) diazabicyclo[2.2.2]octane, diazabicyclo[5.4.0]undec-7-ene, dialkylbenzylamine, dimethylpiperazine, 2,2'-dimorpholinyldiethyl ether and/or pyridine.

The named catalysts can influence the reaction of the carboxyl groups with the epoxide in such a way that a higher proportion of desired secondary OH end groups in the polyester polyol is obtained.

Amines of the general formula (2) can be described in the broadest sense as amino alcohols or the ethers thereof. If R4 is hydrogen, the catalysts are capable of being incorporated into a polyurethane matrix if the polyester polyol is converted with a polyisocyanate. This is advantageous in order to prevent the escape of the catalyst, which may proceed simultaneously in the case of amines with disadvantageous odour problems, to the surface of the polyurethane, the so-called fogging problem or VOC (volatile organic compounds) problem.

Amines of the general formula (3) can be described in the broadest sense as amino (bis)alcohols or the ethers thereof. If R6 or R7 are hydrogen, these catalysts are likewise capable of being incorporated into a polyurethane matrix.

In a further embodiment of the process according to the invention, in the epoxide of the general formula (1) R1 is methyl, ethyl, n-propyl, iso-propyl, n-butyl, sec-butyl, iso-butyl, tert-butyl, cyclohexyl or phenyl. It is preferred in this connection that R1 is methyl. Then the epoxide that is employed is propylene oxide.

In a further embodiment of the process according to the invention, in the amine of the general formula (2) R2 and R3 are methyl, R4 is hydrogen and n=2 or alternatively R2 and R3 are methyl, R4 is —(CH$_2$)$_2$—N(CH$_3$)$_2$ and n=2. Thus either N,N-dimethylethanolamine or bis(2-(dimethylamino)ethyl)ether arises overall.

In a further embodiment of the process according to the invention, in the amine of the general formula (3) R5 is methyl, R6 and R7 are hydrogen, m=2 and o=2. Thus N-methyldiethanolamine arises overall.

In a further embodiment of the process according to the invention the reaction with the epoxide of the general formula (1) takes place at a temperature from ≥70° C. to ≤150° C. The reaction temperature may preferentially amount to ≥80° C. to ≤130° C.

The present invention further provides a polyester polyol with secondary hydroxyl end groups that is obtainable from the reaction of a polyester including carboxyl end groups with an epoxide of the general formula (4) in the presence of a catalyst that includes at least one nitrogen atom per molecule:

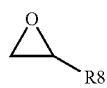

(4)

wherein R8 stands for an alkyl residue or an aryl residue and wherein the polyester including carboxyl end groups exhibits an acid value from ≥25 mg KOH/g to ≤400 mg KOH/g and a hydroxyl value of ≤5 mg KOH/g. The reaction of the polyester carboxylates with the epoxide is effected in the presence of a catalyst that includes at least one nitrogen atom in the molecule. The quantity of this nitrogenous catalyst, relative to the total mass of the reaction charge, may, for example, amount to ≥10 ppm to ≤10,000 ppm, preferably ≥50 ppm to ≤5000 ppm and more preferably ≥100 ppm to ≤2000 ppm.

In particular, this polyester polyol is obtainable by means of a process according to the invention. The polyesters can be analysed with the customary methods, for example by total hydrolysis and separation of the hydrolysis products by means of HPLC. As already mentioned, the polyester polyols according to the invention have the advantage that, on account of the lower rate of reaction of their secondary hydroxyl end groups in the further processing to form polyurethane polymers and in particular polyurethane foams, a greater range of catalyst systems can be employed.

The acid value of the polyesters including carboxyl end groups can be determined on the basis of standard DIN 53402 and may also amount to ≥30 mg KOH/g to ≤300 mg KOH/g or ≥50 mg KOH/g to ≤250 mg KOH/g. The hydroxyl value of the polyesters including carboxyl end groups can be determined on the basis of standard DIN 53240 and may also amount to ≤3 mg KOH/g or ≤1 mg KOH/g.

Advantageously the alcohol component from which the polyester including carboxyl end groups is synthesised is an α,ω-polyol, in particular an α,ω-diol or an α,ω-diol in a proportion amounting to at least 90 mol %.

In one embodiment of the polyester polyol according to the invention the polyester including carboxyl end groups is obtainable from the reaction of ethylene glycol and diethylene glycol and also the higher homologues thereof, 1,3-propanediol, 1,4-butanediol, 1,6-hexanediol, 1,8-octanediol, 1,10-decanediol, 1,12-dodecanediol, 2-methylpropanediol-1,3, neopentyl glycol, 3-methylpentanediol-1,5, glycerin, pentaerythritol and/or 1,1,1-trimethylolpropane with succinic acid, fumaric acid, maleic acid, maleic acid anhydride, glutaric acid, adipic acid, sebacic acid, 1,10-decanedicarboxylic acid, 1,12-dodecanedicarboxylic acid, phthalic acid, phthalic acid anhydride, isophthalic acid, terephthalic acid, pyromellitic acid, trimellitic acid and/or caprolactone.

In a further embodiment of the polyester polyols according to the invention the molar proportion of secondary hydroxyl groups amounts to ≥50 mol % to ≤100 mol %. To be understood by this is the molar proportion in the polyester polyol overall, that is to say, not relative to an individual molecule. It can be determined, for example, by means of $^1$H-NMR spectroscopy. The proportion may also amount to ≥60 mol % to ≤99 mol %. The greater the proportion of secondary hydroxyl groups in the polyester polyol, the slower is the rate of reaction in the course of the production of polyurethane, and the more possibilities arise in the variation of the catalysts.

In a further embodiment of the polyester-polyol composition according to the invention, in the general formula (4) R8 is methyl, ethyl, n-propyl, iso-propyl, n-butyl, sec-butyl, iso-butyl, tert-butyl, cyclohexyl or phenyl. Preferentially R8 is methyl. Then the polyester polyol has been produced by means of propylene oxide.

The present invention further provides a polyester-polyol composition including a polyester polyol according to the invention and also furthermore:

(A) amines of the general formula (5):

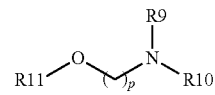

(5)

wherein it holds that:

R9 and R10 are, independently of one another, hydrogen, alkyl or aryl; or

R9 and R10 form, jointly with the N atom carrying them, an aliphatic, unsaturated or aromatic heterocyclic compound;

p is an integer from 1 to 10, that is, 1, 2, 3, 4, 5, 6, 7, 8, 9 or 10;

R11 l is hydrogen, alkyl or aryl; or

R11 stands for —(CH$_2$)$_y$—N(R12)(R13), wherein it holds that:

R12 and R13 are, independently of one another, hydrogen, alkyl or aryl; or

R12 and R13 form, jointly with the N atom carrying them, an aliphatic, unsaturated or aromatic heterocyclic compound;

y is an integer from 1 to 10, that is, 1, 2, 3, 4, 5, 6, 7, 8, 9 or 10;

(B) amines of the general formula (6):

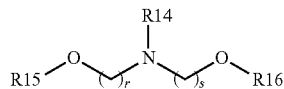

(6)

wherein it holds that:

R14 is hydrogen, alkyl or aryl;

R15 and R16 are, independently of one another, hydrogen, alkyl or aryl;

r and s are, independently of one another, an integer from 1 to 10, that is, 1, 2, 3, 4, 5, 6, 7, 8, 9 or 10;

and/or:

(C) diazabicyclo[2.2.2]octane, diazabicyclo[5.4.0]undec-7-ene, dialkylbenzylamine, dimethylpiperazine, 2,2'-dimorpholinyldiethyl ether and/or pyridine.

Such compounds may in certain variants also be used as so-called expanding catalysts, that is to say, they preferably catalyse the reaction of the isocyanate groups with water, forming carbon dioxide, to a lesser extent also the reaction thereof with hydroxyl groups, forming urethane groups. Therefore this composition can be immediately employed further in the production of polyurethanes. Preferred are N,N-dimethylethanolamine, bis(2-(dimethylamino)ethyl)ether or N-methyldiethanolamine. The quantity of these compounds (A), (B) and/or (C) may amount, relative to the polyol according to the invention, for example to ≥10 ppm to ≤10,000 ppm, preferably ≥50 ppm to ≤5000 ppm and more preferably ≥100 ppm to ≤2000 ppm.

The present invention further provides a polyurethane polymer that is obtainable from the reaction of a polyisocyanate with a polyester polyol according to the invention or with a polyester-polyol composition according to the invention.

The present invention will be elucidated further on the basis of the following Examples. In this connection the materials and abbreviations used have the following significance and sources of supply:

diethylene glycol (DEG): Ineos
adipic acid: BASF
2,2,2-diazabicyclooctane (DABCO): Aldrich
imidazole: Aldrich
N-methylimidazole: Acros Organics
dimethylbenzylamine (DMBA): Aldrich
N,N-dimethylethanolamine (DMEA): Aldrich
N-methyldiethanolamine (MDEA): Aldrich
bis(2-(dimethylamino)ethyl)ether (DMAEE): Alfa Aesar
2,2'-dimorpholinyldiethyl ether (DMDEE): Aldrich
1,1,1-trimethylolpropane (TMP): Aldrich The analyses were carried out as follows:

Viscosity: rheometer MCR 51 manufactured by Anton Paar

Ratio of the primary and secondary OH groups: by means of $^1$H-NMR (Bruker DPX 400, deuterochloroform)

hydroxyl value: on the basis of standard DIN 53240 acid value: on the basis of standard DIN 53402

A) Production of the Polyester Carboxylates

EXAMPLE A-1

In a 4 litre 4-necked flask, equipped with heating mantle, mechanical stirrer, internal thermometer, 40 cm filler column, column head, descending high-efficiency condenser and also diaphragm vacuum pump, 3646 g (34.4 mol) diethylene glycol and 5606 g (38.4 mol) adipic acid were charged under nitrogen veiling and heated, with stirring, to 200° C. in the course of 1 hour, whereby water distilled off at an overhead temperature of 100° C. Subsequently in the course of 90 minutes the internal pressure was slowly lowered to 15 mbar and the reaction was completed for a further 24 hours. Cooling was effected, and the following properties of the product were determined:

hydroxyl value: 0.5 mg KOH/g
acid value: 58.3 mg KOH/g
viscosity: 690 mPas (75° C.), 320 mPas (100° C.)

EXAMPLE A-2

Analogously to the procedure in Example A-1, 3184 g (30.04 mol) diethylene glycol, 349 g (2.06 mol) 1,1,1-trimethylolpropane and 5667 g (38.82 mol) adipic acid were converted into a polyester carboxylate.

Analysis of the product:
hydroxyl value: 0.3 mg KOH/g
acid value: 70.3 mg KOH/g
viscosity: 1620 mPas (75° C.)

B) Production of the Polyester Polyols

General Working Directions for the Examples of Group B:

In a 500 ml glass pressurised reactor the quantity of the corresponding polyester carboxylate specified in Tables 1 to 4 and also 0.20 g (1000 ppm with respect to the overall charge) of the corresponding catalyst were charged under protective gas (nitrogen) and then heated to 125° C. Subsequently the quantity of propylene oxide specified in Tables 1-4 was added in metered amounts during the specified time, whereby the pressure of the reactor was maintained at 4.2 bar (absolute). After the specified secondary-reaction time with stirring at 125° C., readily volatile portions were distilled off at 90° C. (1 mbar), and the reaction mixture was subsequently cooled to room temperature.

The results are reproduced in the following Tables 1 to 4.

TABLE 1

| Example | B-1 | B-2 | B-3 | B-4 |
|---|---|---|---|---|
| Polyester carboxylate | A-1 | A-1 | A-1 | A-1 |
| Polyester carboxylate [g] | 178.1 | 178.1 | 178.1 | 178.1 |
| Catalyst | DMEA | N-methyl-imidazole | DMEA | DMEA |
| Quantity of catalyst [ppm] | 1000 | 1000 | 1000 | 1000 |
| Propylene oxide [g] | 21.9 | 21.9 | 21.9 | 21.9 |
| Metering-time [min] | 62 | 84 | 65 | 76 |
| Secondary reaction [min] | 60 | 60 | 40 | 20 |
| Hydroxyl value [mg KOH/g] | 55.6 | 59.5 | 54.2 | 55.4 |
| Acid value [mg KOH/g] | 0.03 | 0.01 | 0.45 | 0.35 |
| Viscosity [mPas, 25° C.] | 7640 | 7260 | 7695 | 7790 |
| OH groups 1°/2° [mol/mol] | 32/68 | 80/20 | 31/69 | 30/70 |

TABLE 2

| Example | B-5 | B-6 | B-7 | B-8 |
|---|---|---|---|---|
| Polyester carboxylate | A-1 | A-1 | A-1 | A-2 |
| Polyester carboxylate [g] | 183.1 | 178.1 | 178.1 | 174.05 |
| Catalyst | DMEA | MDEA | MDEA | DMEA |
| Quantity of catalyst [ppm] | 1000 | 1000 | 1000 | 1000 |
| Propylene oxide [g] | 16.9 | 21.9 | 21.9 | 25.95 |
| Metering-time [min] | 32 | 82 | 102 | 87 |

TABLE 2-continued

| Example | B-5 | B-6 | B-7 | B-8 |
|---|---|---|---|---|
| Secondary reaction [min] | 300 | 60 | 40 | 60 |
| Hydroxyl value [mg KOH/g] | 55.7 | 54.6 | 54.0 | 65.2 |
| Acid value [mg KOH/g] | 0.01 | 0.54 | 1.33 | 0.04 |
| Viscosity [mPas, 25° C.] | 1620 | 7790 | 7890 | 18,155 |
| OH groups 1°/2° [mol/mol] | 38/62 | 32/68 | 35/65 | 38/62 |

TABLE 3

| Example | B-9 | B-10 | B-11 | B-12 |
|---|---|---|---|---|
| Polyester carboxylate | A-2 | A-1 | A-1 | A-1 |
| Polyester carboxylate [g] | 174.05 | 178.1 | 178.1 | 178.1 |
| Catalyst | MDEA | DMAEE | DABCO | imidazole |
| Quantity of catalyst [ppm] | 1000 | 1000 | 1000 | 1000 |
| Propylene oxide [g] | 25.95 | 21.9 | 21.9 | 21.9 |
| Metering-time [min] | 195 | 80 | 70 | 53 |
| Secondary reaction [min] | 60 | 60 | 105 | 60 |
| Hydroxyl value [mg KOH/g] | 65.8 | 54.9 | 53.5 | 58.4 |
| Acid value [mg KOH/g] | 0.04 | 0.11 | 0.56 | 0.01 |
| Viscosity [mPas, 25° C.] | 15,790 | 8200 | 8340 | 7775 |
| OH groups 1°/2° [mol/mol] | 32/68 | 50/50 | 31/69 | 79/21 |

TABLE 4

| Example | B-13 | B-14 | B-15 | B-16 | B-17 |
|---|---|---|---|---|---|
| Polyester carboxylate | A-1 | A-1 | A-1 | A-2 | A-1 |
| Polyester carboxylate [g] | 178.1 | 178.1 | 178.1 | 174.05 | 178.1 |
| Catalyst | DMDEE | DMBA | dimethyl-piperazine | DABCO | pyridine |
| Quantity of catalyst [ppm] | 1000 | 1000 | 1000 | 1000 | 1000 |
| Propylene oxide [g] | 21.9 | 21.9 | 21.9 | 25.95 | 21.9 |
| Metering-time [min] | 115 | 110 | 125 | 190 | 52 |
| Secondary reaction [min] | 60 | 60 | 60 | 60 | 60 |
| Hydroxyl value [mg KOH/g] | 50.4 | 54.7 | 52.8 | 64.5 | 58.3 |
| Acid value [mg KOH/g] | 2.32 | 0.02 | 1.07 | 0.06 | 3.06 |
| Viscosity [mPas, 25° C.] | 8380 | 7620 | 8010 | 18,140 | 8005 |
| OH groups 1°/2° [mol/mol] | 30/70 | 34/66 | 30/70 | 33/67 | 35/65 |

In the polyester carboxylates A-1 and A-2 employed, practically wholly carboxyl end groups are present, and no hydroxyl end groups. This can be read off on the basis of the hydroxyl values after the reaction to yield the polyester, which lie below 1 mg KOH/g. The conversion of the polyester carboxylate with the epoxide proceeds likewise practically quantitatively in respect of all the carboxyl groups of the polyester carboxylate. The conversion can be discerned from the low acid values and from the hydroxyl values which correspond well to the original acid values of the polyester carboxylates A-1 and A-2. So one OH group was formed per carboxyl group. Certain catalysts enable desired secondary OH end groups to be obtained, for example, in at least 50 mol %.

The invention claimed is:

1. A process for producing a polyester polyol comprising secondary hydroxyl end groups which comprises reacting a polyester comprising carboxyl end groups with an epoxide of formula (1):

(1)

wherein R1 represents an alkyl or an aryl and the reaction is carried out in the presence of a catalyst comprising:
(A) amines of formula (2):

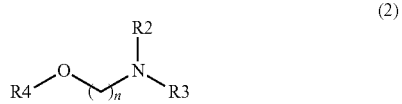
(2)

wherein:
R2 and R3 represent, independently of one another, hydrogen, alkyl or aryl; or
R2 and R3 form, jointly with the N atom carrying them, an aliphatic, unsaturated or aromatic heterocyclic compound;
n represents an integer from 1 to 10;
R4 represents hydrogen, alkyl or aryl; or R4 represents —(CH$_2$)$_x$—N(R41)(R42), wherein
R41 and R42 represent, independently of one another, hydrogen, alkyl or aryl; or
R41 and R42 form, jointly with the N atom carrying them, an aliphatic, unsaturated or aromatic heterocyclic compound;
x represents an integer from 1 to 10;
(B) amines of formula (3):

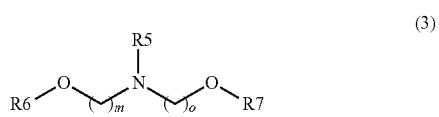
(3)

wherein
R5 represents hydrogen, alkyl or aryl;
R6 and R7 represent, independently of one another, hydrogen, alkyl or aryl;
m and o represent, independently of one another, an integer from 1 to 10; and/or:
(C) diazabicyclo[2.2.2]octane, diazabicyclo[5.4.0]undec-7-ene, dialkylbenzylamine, dimethylpiperazine, 2,2'-dimorpholinyldiethyl ether and/or pyridine,
wherein the polyester comprising carboxyl end groups exhibits an acid value of from ≥25 mg KOH/g to ≤400 mg KOH/g and a hydroxyl value of ≤5 mg KOH/g and wherein the polyester comprising carboxyl end groups is produced by ≥1.03 mol to ≤1.90 mol carboxyl groups or carboxyl-group equivalents of an acid component being employed per mol hydroxyl groups of an alcohol, and wherein the molar proportion of secondary hydroxyl groups amounts to ≥50 mol % to ≤100 mol %.

2. The process according to claim 1, wherein the polyester comprising carboxyl end groups is produced immediately before the reaction with the epoxide of formula (1).

3. The process according to claim 1, wherein the polyester comprising carboxyl end groups is obtained from the reaction of ethylene glycol, diethylene glycol, the higher homologues thereof, 1,3-propanediol, 1,4-butanediol, 1,6-hexanediol, 1,8-octanediol, 1,10-decanediol, 1,12-dodecanediol, 2-methylpropanediol-1,3, neopentyl glycol, 3-methylpentanediol-1,5, glycerin, pentaerythritol and/or 1,1,1-trimethylolpropane with succinic acid, fumaric acid, maleic acid, maleic acid anhydride, glutaric acid, adipic acid, sebacic acid, 1,10-decanedicarboxylic acid, 1,12-dodecanedicarboxylic acid, phthalic acid, phthalic acid anhydride, isophthalic acid, terephthalic acid, pyromellitic acid, trimellitic acid and/or caprolactone.

4. The process according to claim 1, wherein in the epoxide of formula (1) R1 represents methyl, ethyl, n-propyl, iso-propyl, n-butyl, sec-butyl, iso-butyl, tert-butyl, cyclohexyl or phenyl.

5. The process according to claim 1, wherein in the amine of formula (2), R2 and R3 represent methyl, R4 represents hydrogen and n is 2; or alternatively R2 and R3 represent methyl, R4 represents —(CH2)2—N(CH3)2 and n is 2.

6. The process according to claim 1, wherein in the amine of formula (3) R5 represents methyl, R6 and R7 represent hydrogen, m is 2 and o is 2.

7. The process according to claim 1, wherein the reaction with the epoxide of formula (1) takes place at a temperature of from ≥70° C. to ≤150° C.

* * * * *